(12) United States Patent
Rahn

(10) Patent No.: US 6,215,933 B1
(45) Date of Patent: Apr. 10, 2001

(54) BIFILAR FOG COIL WINDING PATTERN WITH IMPROVED SHUPE BIAS CANCELING PROPERTIES

(75) Inventor: John Phillip Rahn, West Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/353,414

(22) Filed: Jul. 15, 1999

(51) Int. Cl.[7] .................................................. G02B 6/02
(52) U.S. Cl. .......................... 385/123; 385/115; 385/134
(58) Field of Search ........................ 385/123, 12, 115, 385/134, 116, 121, 114, 147, 128; 356/460, 463, 464, 465, 462, 461, 483

(56) References Cited

U.S. PATENT DOCUMENTS

| | | | |
|---|---|---|---|
| 4,793,708 | 12/1988 | Bednarz | 356/350 |
| 5,545,892 | 8/1996 | Billinski et al. | 250/231.12 |
| 5,841,932 | * 11/1998 | Page et al. | 385/134 |

* cited by examiner

Primary Examiner—Phan T. H. Palmer
(74) Attorney, Agent, or Firm—Price and Gess

(57) ABSTRACT

A bifilar FOG coil winding method employs two identical parallel fibers, each one-half the length of the final FOG coil wound between first and second payout spools so that the respective midpoint of each fiber is located between the two spools. Both parallel fibers are then wound to form a FOG coil using Frigo's quadrupole or dipole winding technique. Prior to winding, one of the payout spools is rotated 180° (degrees) about its fiber pair.

22 Claims, 3 Drawing Sheets

BIFILAR FOG COIL WINDING PATTERN WITH IMPROVED SHUPE BIAS CANCELING PROPERTIES

BACKGROUND OF TEE INVENTION

1. Field of the Invention

The present invention relates generally to fiber optic rotation sensing devices such as gyroscopes and more particularly to an improved sensing coil useful in such devices.

2. Description of Related Art

A fiber optic gyroscope comprises the following main components: (1) a light source, (2) a beamsplitter (either a fiber optic directional coupler or an integrated-optics Y-junction), (3) a fiber optic coil, (4) a polarizer (and sometimes one or more depolarizes), and (5) a detector. Light from the light source is split by the beamsplitter into copropagating waves that travel through the sensing coil. Associated electronics measures the phase relationships between the two interfering, counterpropagating beams of light that emerge from the opposite ends of the coil. The difference between the phase shifts experienced by the two beams provides a measure of the rate of rotation of the platform to which the instrument is fixed.

Environmental factors can affect the measured phase shift difference between the counterpropagating beams, thereby introducing a bias error. Such environmental factors include variables such as temperature, vibration (acoustical and mechanical) and magnetic fields. These are both time-varying and unevenly distributed throughout the coil and induce variations in index of refraction and length that each counterpropagating wave encounters as it travels through the coil. The phase shifts imposed upon the two waves due to environmental factors can be unequal, producing a net undesirable phase shift which is indistinguishable from the rotation-induced signal.

A very important fiber optic gyro (FOG) bias mechanism or "environmental factor," first described by Shupe, is the time dependent thermal asymmetry of the optical path. Shupe noted that FOG coil winding patterns that kept the fiber segments that are clockwise (CW) of the fiber midpoint adjacent (co-located) with the matching fiber segments that are counter clockwise (CCW) of fiber midpoint would cancel out the Shupe bias, since then the thermal perturbations would occur equally to the CW and CCW fiber halves and the optical pathlength would remain symmetrical about its midpoint.

Frigo suggested radial dipole and radial quadrupole winding patterns as a way of co-locating matched CW and CCW fiber segments. These winding patterns used a single fiber with the wind starting with the fiber midpoint at the coil inner radius (hub). Then the first layer from one of the two payout spools would be wound by rotating the FOG coil spool CW. The other payout spool would then be used to wind a layer by rotating the FOG coil spool CCW and so on, so that CW and CCW matched segments were always disposed within about one layer of each other.

U.S. Pat. No. 4,793,708 of Bednarz, entitled "Fiber Optic Sensing Coil" teaches a symmetric fiber optic sensing coil formed by duopole or quadrupole winding. The coils described in that patent employ orthogonally wound monofilament fibers and exhibit enhanced performance over the conventional helixtype winding.

Experiments have shown that the quadrupole winding procedure is capable of reducing Shupe bias by a factor of a few hundred with respect to a simple thread wind where one of the fiber ends is at the coil hub. However, even this large reduction factor is not adequate for aircraft accuracy navigation. One of the problems is that the quadrupole wind has a built-in bias in that the first and fourth layers of each quadrupole period are dominant over the second and third layers. A second problem is that the quadrupole coil winding pattern must be without defects in order to achieve its expected performance.

SUMMARY OF THE INVENTION

The invention relates to an improved method of winding a fiber optic sensor coil employing a bifilar winding technique. The method includes the steps of winding a pair of parallel optical fibers on a first spool and then winding the pair of fibers from the first spool onto a second spool such that the midpoint of each of the two fibers is located between the first and second spools. Next, the pair of fibers from each of the first and second spools are payed out so as to create a fiber optic sensor coil using, for example, Frigo's quadrupole or dipole winding technique.

Another novel feature or aspect of the invention involves rotating one of the first and second spools 180° about its fiber pair prior to winding the sensor coil. This maneuver avoids having one of the fiber halves (i.e., CW) always displaced axially from the other fiber half (i.e., CCW).

BRIEF DESCRIPTION OF THE DRAWINGS

The objects and features of the present invention may be best understood by reference to the following detailed description, taken in connection with the accompanying drawings of which.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications within the scope of the invention will remain readily apparent to those skilled in the art from the general principles apparent from the following description.

Figure 1:
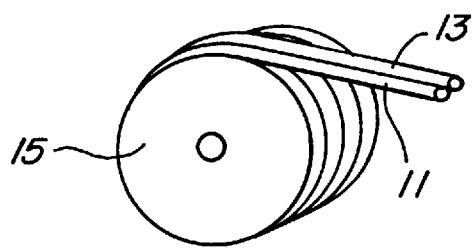
FIG. 1 is a perspective view of a first payout spool.

A bifilar winding method according to the preferred embodiment will now be described in conjunction with FIGS. 1–5. In a first step according to this method, two identical fibers 11, 13, each one-half the length of the final FOG coil, are first wound parallel to each other onto a single payout spool 15, as illustrated by FIG. 1. (One of these fibers will become the CW half of the FOG coil and the other fiber will become the CCW half.) In a second step illustrated by FIG. 2, one-half of the length of both fibers 11, 13 is transferred to another payout spool 17 so that the respective midpoint 19, 21 of each fiber is located between the two spools 15, 17.

Figure 2:
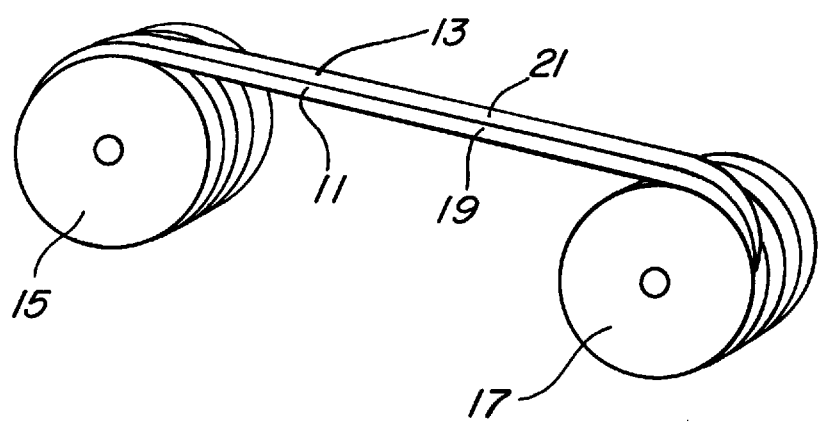
FIG. 2 is a perspective view of first and second payout spools with a pair of optical fibers wound around and between them.
Figure 3:
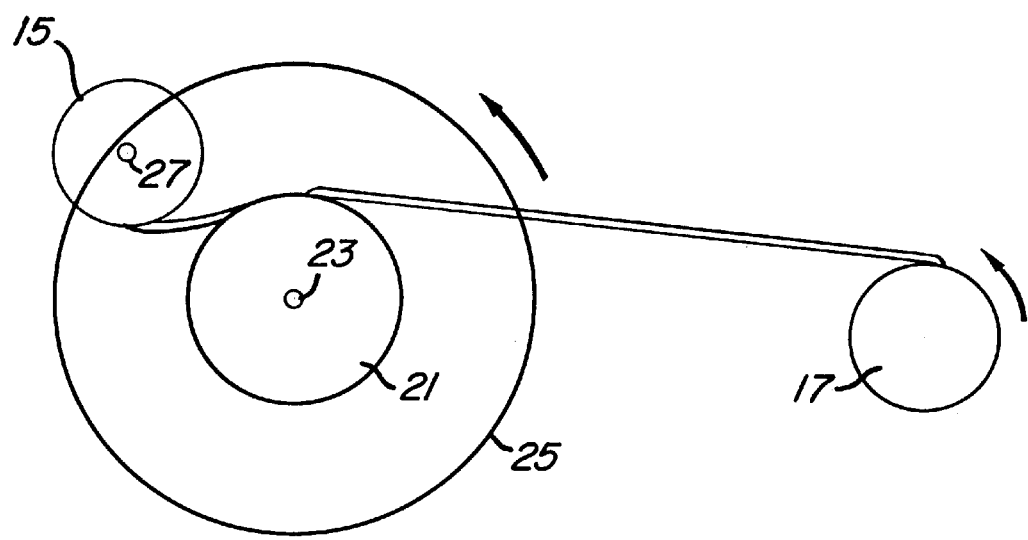
FIGS. 3 and 4 are schematic diagrams of coil winding apparatus useful in performing the method of the preferred embodiment.

After performing the steps illustrated in FIGS. 1 and 2, both parallel fibers 11, 13 are wound onto the FOG coil using Frigo's quadrupole or dipole winding technique described above. One exemplary set-up for achieving such winding is illustrated schematically in FIGS. 3 and 4. Prior to winding, the midpoints 19, 21 are taped or otherwise fixed to a FOG coil form or spool located on a main shaft 23. Then, as illustrated in FIG. 3, the right payout spool 17 is arranged to rotate counterclockwise so as to payout the parallel fibers 11, 13 counterclockwise onto the FOG coil 21. The FOG coil 21 is rotated counterclockwise and moved axially in conventional fashion to distribute the fibers 11, 13. A shaft support plate 25 is mounted to rotate in unison with the FOG coil 21. The shaft support plate 25 bears an ancillary shaft 27 on which the left payout spool 15 is carried during the counter clockwise winding step.

It will be noted that the first or left spool 15 has been inverted or flipped before placing it on the ancillary shaft 27. Accordingly, the second fiber 13 is the nearer fiber of the pair 11, 13; whereas the nearer fiber of the pair 11, 13 on the second or right spool 17 is the first fiber 11. In any event, since the left payout spool 15 "goes along for the ride" with the FOG coil 21, no fibers are wound from it onto the FOG coil 21 in the step represented by FIG. 3.

Figure 4:
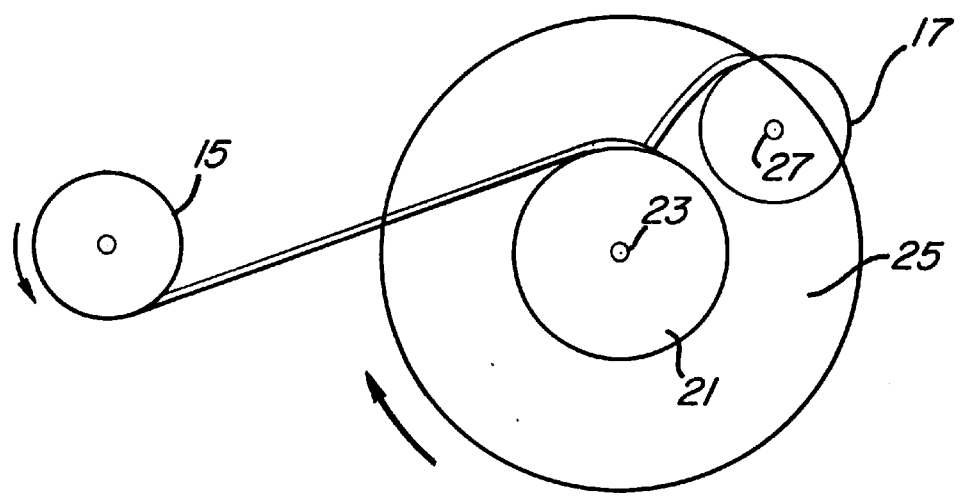

FIG. 4 illustrates the apparatus of FIG. 3 in a clockwise winding mode. In this mode, the second or right payout spool 17 goes along for the ride on the ancillary shaft 27, while the left or second spool 15 is rotated counterclockwise and the FOG coil 23 is rotated clockwise. In this manner, the fibers 13, 11 from the payout spool 15 are wound in clockwise fashion onto the FOG coil 21.

Figure 5:
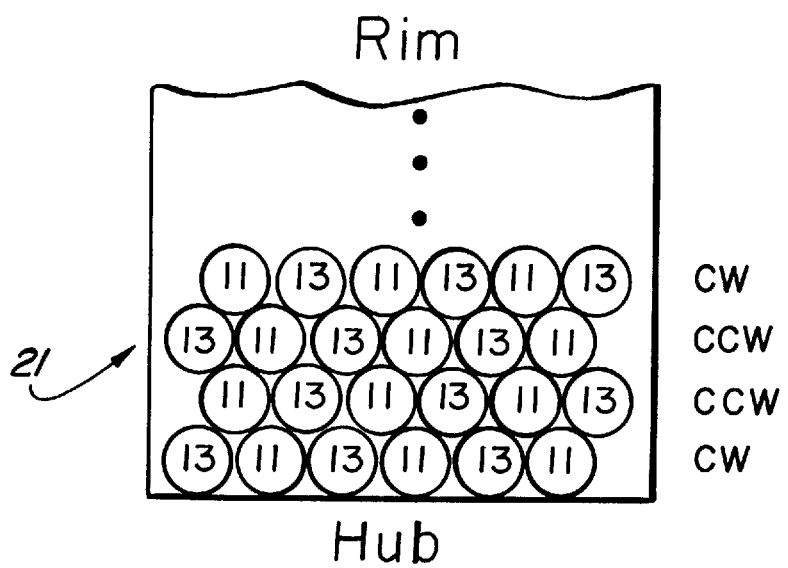
FIG. 5 is a simplified cross sectional view of one type of FOG coil wound according to the preferred embodiment.

To wind a quadrupole configuration using the set-up of FIGS. 3 and 4, a first fiber layer is wound clockwise from one edge in a positive direction and the next two fiber layers are wound counterclockwise in a positive direction for the first of the two layers and in a negative direction for the second of the two layers. The next or fourth fiber layer is wound clockwise in a negative direction, and the next two layers are wound counterclockwise in a positive then negative direction, respectively, etc., in accordance with the Frigo winding technique. A simplified example of the relative positioning of the fibers 11, 13 in respective layers CW, CCW, CCW, CW resulting from the bifilar winding technique illustrated in connection with FIGS. 1–4 is shown in FIG. 5.

Figure 6:
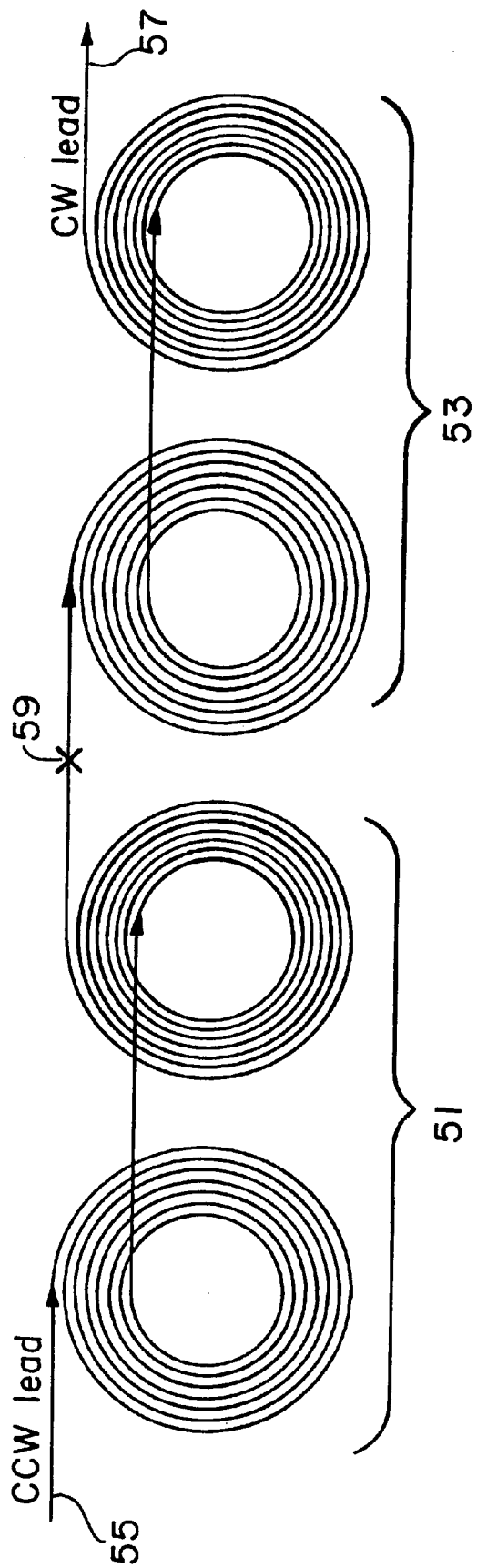
FIG. 6 is a diagram illustrating a fiber trajectory achievable according to the preferred embodiment.

The fiber trajectory resulting from the just described procedure is shown in FIG. 6, except for the splice. The diagram of FIG. 6 is split into 4 equivalent parts. The light trajectory through the first fiber (CCW from midpoint) is shown on the left side 51 and the light trajectory through the second parallel fiber is shown on the right side 53. By following the arrows and the radial spirals, it is clear that the light injected at the CCW lead 55 propagates always in a CW sense (as required for a non-zero Sagnac phase shift) around the coil center until it arrives at the CW lead 57.

The splice 59 between the CW and CCW halves 51, 53 must be made after the FOG coil winding 21 has been completed. For a broadband FOG light source, the splice needs to be located many coherence lengths (a few millimeters) from the actual midpoint of the coil to avoid non-reciprocity due to reflections from near the midpoint. It has been shown experimentally that the Shupe bias cancellation of a canceling wind due to having a few millimeters of stress and thermal asymmetry is not seriously degraded.

It is apparent from FIG. 6 that CW and CCW fiber segments are co-located radially so that the usual deleterious quadrupole-wind radial bias is nullified by the bifilar winding technique. It is also apparent that the coil midpoint 59 has moved to the outer radius (rim) of the coil and the ends (leads) 55, 57, which are most sensitive to the thermal perturbations, are also at the rim of the coil. Thus, for the disclosed bifilar wind, the light makes two trips from the rim to the hub and back (as opposed to only one trip for the standard monofilar wind). This increase in diversity of path position or trajectory should provide some additional averaging out of the thermal perturbations of the light.

What is not readily apparent from FIG. 6 is that, if no countermeasures are taken, the CW fiber will always be axially displaced one fiber width from the CCW fiber and that will result in an axial dipole which has reduced Shupe cancellation capabilities. However, the flipping or inversion of the payout spool 15 as illustrated in FIGS. 3 and 4, just prior to the start of the wind, establishes essentially perfect axial co-location of segments equidistant from the coil midpoint 37. One has only to rotate one of the 2 payout spools 180 degrees about its fiber pair, thereby establishing a crossover at $s=L/4$ and $s=3L/4$ where s is the distance along the FOG coil fiber from its end and L is its total length.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A method of winding a fiber optic sensor coil comprising the steps of:
   winding a pair of parallel optical fibers on a first spool;
   winding the pair of fibers from the first spool onto a second spool such that the midpoint of each fiber is located between the first and second spools;
   paying out the pair of fibers from each of said first and second spools so as to create said sensor coil.

2. The method of claim 1 further including the step of rotating a selected one of the first and second spools 180° about its fiber pair prior to unwinding the fibers from that selected spool.

3. The method of claim 1 wherein one of the first and second spools is arranged to payout its pair of fibers in counterclockwise fashion.

4. The method of claim 3 wherein the other of said first and second spools is arranged to payout its pairs of fibers in clockwise fashion.

5. The method of claim 4 further including the step of rotating a selected one of the first and second spools 180° about its fiber pair prior to unwinding the fibers from that selected spool.

6. The method of claim 5 wherein the one of said spools is arranged to rotate with a said sensor coil during formation thereof, such that no fibers are unwound from said one of said spools during an interval wherein fibers are being payed out from the other of said spools.

7. The method of claim 1 wherein said pair of fibers are payed out from said first and second spools using a dipole winding technique.

8. The method of claim 7 further including the step of rotating a selected one of the first and second spools 180° about its fiber pair prior to unwinding the fibers from that selected spool.

9. The method of claim 1 wherein said pair of fibers are payed out from said first and second spools using a quadrupole winding technique.

10. The method of claim 9 further including the step of rotating a selected one of the first and second spools 180° about its fiber pair prior to unwinding the fibers from that selected spool.

11. The method of claim 1 wherein the said midpoints are taped to a coil forming component on which said sensor coil is to be wound prior to paying out fibers from either said first or second spool.

12. The method of claim 11 further including the steps of winding the pair of fibers from said first spool onto said coil forming component in clockwise fashion and then winding the pair of fibers from said second spool onto said component in counterclockwise fashion.

13. The method of claim 12 wherein said forming component comprises:

a spool located on a main shaft and wherein a shaft support plate is mounted to rotate in unison with said spool.

14. The method of claim 13 wherein said shaft support plate carries an ancillary shaft for mounting one of said first and second spools during a time when fibers are not being payed out from said one of said first and second spools.

15. The method of claim 14 further including the step of rotating a selected one of the first and second spools 1800 about its fiber pair prior to unwinding the fibers from that selected spool.

16. An article of manufacture comprising:

a fiber optic sensor coil having a plurality of adjacent layers of turns thereon, wherein each said layer comprises an equal number of a first optical fiber and a second optical fiber, and each turn of the first optical fiber within each layer is disposed immediately adjacent a corresponding turn of the second optical fiber.

17. The article of manufacture of claim 16 wherein said sensor coil is formed by a pair of parallel wound optical fibers.

18. The article of manufacture of claim 17 wherein said sensor coil is a FOG coil.

19. A fiber optic coil as recited in claim 16 wherein a path of light traveling through the fiber optic coil travels from a rim of the fiber optic coil to the hub of the fiber optic coil and back to the rim of the fiber optic coil twice.

20. A fiber optic coil comprising winds from first and second lengths of optical fiber joined at one of their ends to form an extended optical fiber, the first length of optical fiber and the second length of optical fiber wound such that a midpoint of the first length of optical fiber and a midpoint of the second length of optical fiber are located at an innermost layer of windings in the radial direction, and the joined ends of the first and second lengths of optical fiber as well as the unjoined ends of the first and second lengths of optical fiber are located at an outermost layer of windings in the radial direction.

21. A fiber optic coil comprising a pair of optical fibers wound circumferentially into a plurality of successive layers, each wind of a first strand of the optical fiber located immediately adjacent a second strand of the optical fiber, wherein both a first end of the first optical fiber and a first end of the second optical fiber are located on the outermost layer of the fiber optic coil, and where the second end of the first optical fiber and the second end of the second optical fiber are joined together at a juncture, the juncture located on the outermost layer of the fiber optic coil.

22. A fiber optic coil comprising layers of windings of a strand of optical fiber wound in pairs of clockwise and counterclockwise windings, where said strand of optical fiber is divided into four equal lengths, the winding pattern resulting in an average radial distance for the total length of each of the four equal lengths of optical fiber is approximately the midpoint between the innermost layer in the radial direction and the outermost layer in the radial direction.

* * * * *